Sept. 20, 1971     H. E. BURNES     3,606,508
COUNTER TOP

Filed Dec. 24, 1969     2 Sheets-Sheet 1

INVENTOR.
HARRY E. BURNES
BY Rogers, Bereskin, & Parr

Sept. 20, 1971  H. E. BURNES  3,606,508
COUNTER TOP

Filed Dec. 24, 1969  2 Sheets-Sheet 2

INVENTOR.
HARRY E. BURNES

BY *Rogers, Bereskin, & Parr*

United States Patent Office 3,606,508
Patented Sept. 20, 1971

3,606,508
COUNTER TOP
Harry E. Burnes, 34 Highway Ave.,
London, Ontario, Canada
Filed Dec. 24, 1969, Ser. No. 887,930
Int. Cl. A47b 96/18
U.S. Cl. 312—140.3          5 Claims

ABSTRACT OF THE DISCLOSURE

A counter top is provided which includes a relatively strong joint between a horizontal and an upright section. The counter top includes a base structure which is preferably made by attaching unfinished strips to a panel and then forming the required curves on the strips and the panel. The panel is then cut longitudinally to form the horizontal and upright sections and the sections are then glued together. The horizontal section has a recessed step at the joint between the sections and a filler strip is glued in the recess and to the front face of the upright section. The filler strip has a concave curve which merges smoothly into the exposed adjacent surfaces of the horizontal and upright sections for supporting a laminate of plastic or the like.

---

This invention relates to an improved counter top and to a method of making a counter top.

Counter tops commonly include a base structure of wood or the like having a generally planar horizontal surface, a rear upright surface and a curved surface which smoothly interconnects the horizontal and the upright surfaces. The front face of the counter top is often curved upwardly and rearwardly into the horizontal surface to form a roll which extends a short distance above the horizontal surface of the counter top, and the upper end of the upright surface is often curved rearwardly to form a rear roll. The rolls and curved surface are blended into the horizontal and upright surfaces to present a smoothly contoured base structure for receiving a sheet of plastic laminate which is shaped to cover the base structure.

Base structures are usually made from horizontal and vertical sections with shaped filler strips attached to the sections to support curved portions of the laminate. Nails or glue are used to join the sections and the rigidity of the laminate is relied upon for some of the required strength at the joint.

Prior methods of manufacturing counter tops have included attaching the horizontal section to the vertical section and then attaching pre-formed strips or extrusions to the sections complete the base structure. A pre-shaped plastic laminate is then glued to the base structure to complete the counter top. To obtain a satisfactory counter top by this method, it is necessary to manufacture the base structure accurately so that when the laminate is glued to the base structure there are no discontinuities or gaps between the base structure and the laminate. Such gaps which are caused by differences between the dimensions of the base structure and the corresponding dimensions of the laminate allow moisture to attack the glue between the base structure and the laminate with eventual weakening of the counter top.

According to the present invention a simple base structure is provided which includes a relatively strong joint between the horizontal and upright sections. The base structure is preferably made by attaching unfinished strips to a panel and then forming the required curves on the strips and the panel. The panel is then cut longitudinally to form a horizontal and an upright section and the sections are then glued together. This method controls the dimensions of the finished base structure accurately because the curves are formed by spaced-apart cutting tools which are located on a common drive shaft.

Figure 1:
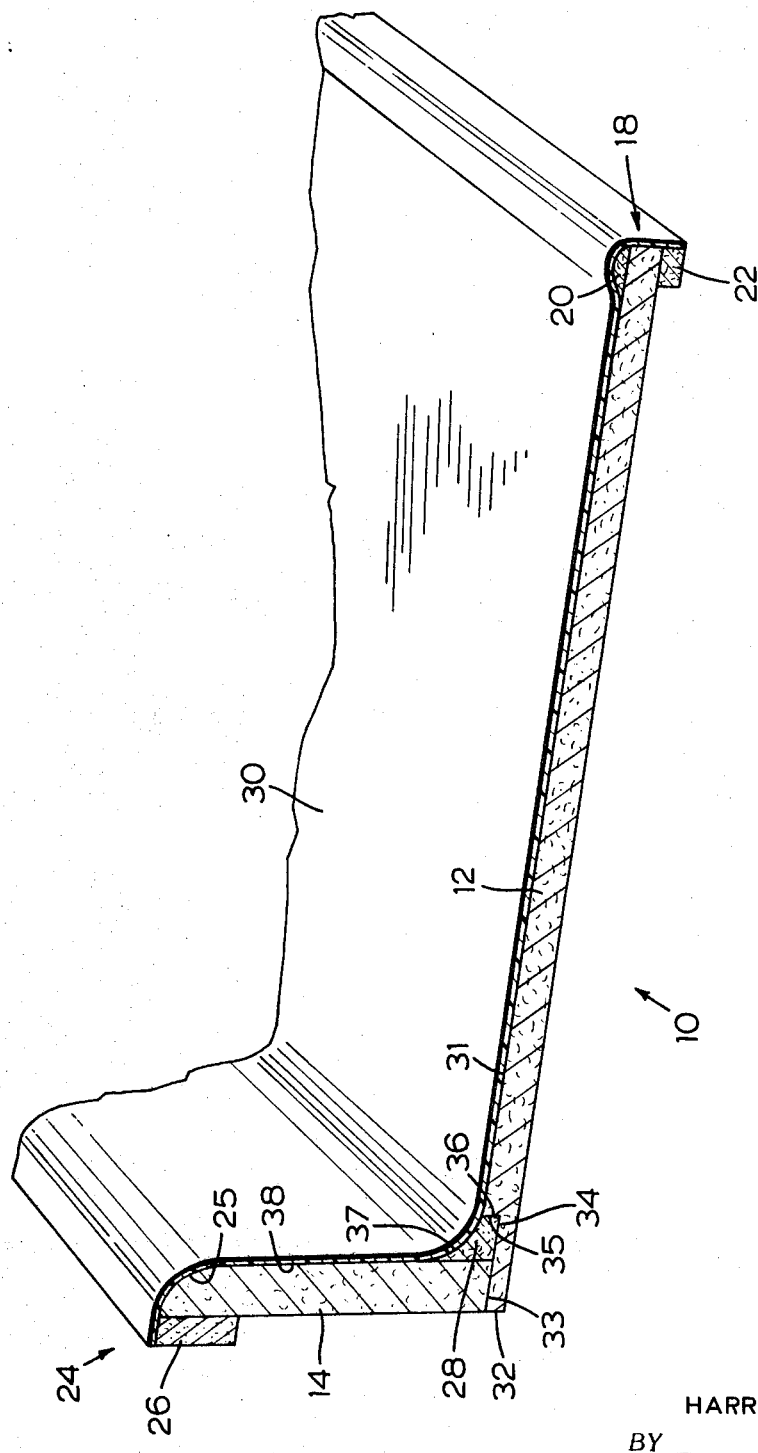
Figure 2:
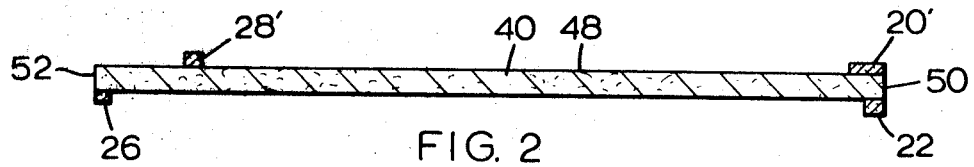
Figure 3:
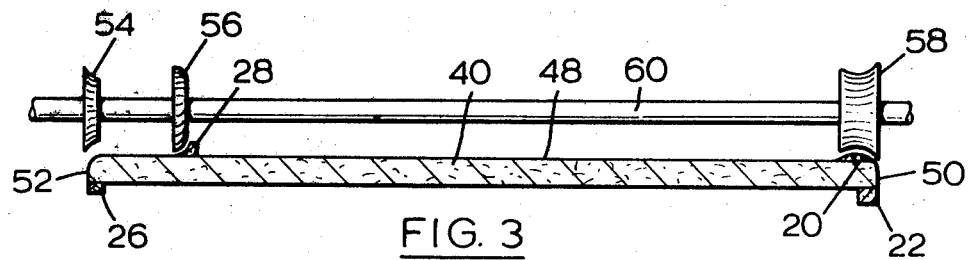

These and other aspects of the invention will be better understood with reference to the drawings wherein:

FIG. 1 is a perspective sectional view of a preferred embodiment of a counter top according to the invention; and FIGS. 2 to 5 illustrate steps in a preferred method of making the counter top.

As seen in FIG. 1, a counter top 10 has a base structure comprising a generally rectangular horizontal section 12 attached adjacent its rear upright face to a generally rectangular upright section 14. The sections 12 and 14 are preferably of chipboard or other suitable material. The counter top has a front roll 18 which includes a front filler strip 20 and a front trim strip 22. A rear roll 24 is formed in a curved portion 25 of the upright section 14 and extends over a rear trim strip 26. A rear filler strip 28 is attached to the horizontal and upright sections to provide a continuous curve for supporting a curved portion of a sheet of plastic laminate 30. The strips are preferably of the same material as the sections 12, 14 and the laminate 30 is glued continuously to the upper and forward-facing surfaces of the base structure to complete the counter top. Any suitable glue can be used depending upon the material used for the sections 12, 14 and the strips 20, 22, 26 and 28.

The upper surface 31 of the horizontal section 12 is stepped adjacent the rear face 32 to receive the respective lower faces 33, 34 of the upright section 14 and the filler strip 28. The step or recess has a vertical face 35 which is substantially equal in height to the vertical extent of the front face 36 of the strip 28 so that a concave surface 37 formed in the strip 28 merges smoothly into the upper face 31 of the horizontal section 12. The concave surface 37 also merges smoothly into the forward face 38 of the upright section 14.

Reference is next made to FIGS. 2 to 5 to describe a preferred method of constructing the counter top. Beginning with FIG. 2, a panel 40 of wood, chipboard or other material which is easily worked and readily glued has rectangular strips 20', 28', 22 and 26 glued to it. The strips are preferably made from the same material as the panel 40, although they could also be made of any material which can be shaped easily and which has the desired rigidity. The strip 20' is glued to the upper surface 48 of the panel 40 adjacent the front face 50 of the panel. The strip 28' is also glued to the upper surface 48 such that the forward facing side of the strip 28' is spaced from the rear face 52 of the panel by a distance equal to the height of the upright section 14 (FIG. 1). Next the strips 22, 26 are glued to the underside of the panel 40, the strip 22 being attached adjacent the front face 50 and the strip 26 adjacent the rear face 52.

After the strips have been attached to the panel 40, the panel is moved past three rotating profile cutters 54, 56 and 58 (FIG. 3) which are attached to a driven shaft 60. The cutter 54 rounds the corner formed where the upper surface 48 of the panel 40 meets the rear face 52 to thereby form the curved portion 25 of the upright section 14 (FIG. 1).

The profile cutter 56 shapes the strip 28' to form the concave surface 37 of the filler strip 28 (FIG. 1). The concave surface 37 extends between the lower rear edge (i.e. the line between the lower and rear faces) of the strip 28' to a longitudinal line intermediate the upper front and rear edges of the top face of the strip 28'. The cutter 58 shapes a continuous corner curve on the strip 20' to form the filler strip 20, and also shapes a portion of the front surface 50 of the panel 40 to form the front roll 18 (FIG. 1).

Figure 4:
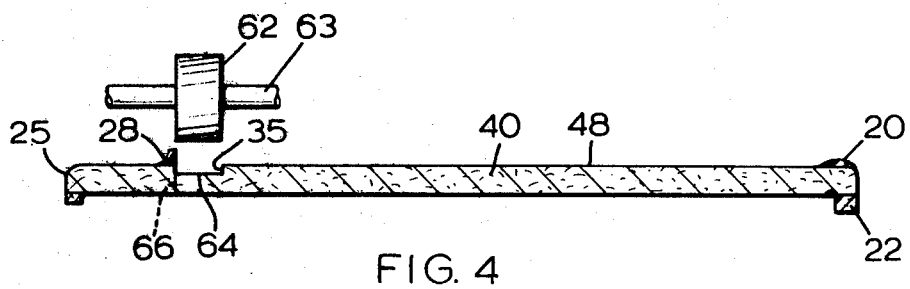
Figure 5:
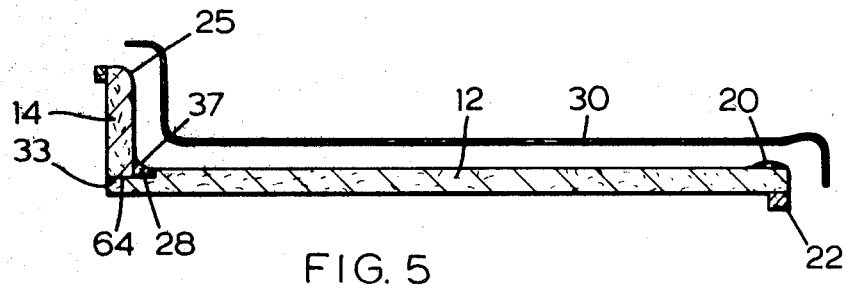

The panel 40 is then moved into the position shown in FIG. 4 where a fourth rotating cutter 62 mounted on a driven shaft 63 cuts a rectangular recess 64 in the upper surface 48 of the panel 40 to form the vertical face 35 and horizontal face of the step in the horizontal section 12 (FIG. 1). The rear face of recess 64 lies in a plane containing the front face of the strip 28 and the width of the recess is substantially equal to the combined thickness of the panel 40 and the strip 28. While the cutter 62 has been shown on a different shaft from that carrying the cutters 54, 56 and 58, all of the cutters can be placed on the same shaft if desired. Such an arrangement would help to control the cutting tolerances since the relationship between the cutters would control the positions of the curves and the slot.

The panel 40 next passes a slitting knife (not shown) which cuts the panel on the dotted line 66 (FIG. 4) into the horizontal section 12 and the upright section 14 (FIG. 1). If desired the knife can be placed on the shaft 63 together with the cutter 62 so that both recessing and cutting operations would take place simultaneously.

Next the upright section 14 is rotated through 90 degrees and glued with its lower face 33 in contact with the upper surface of the recess 64. The strip 28 is also glued into the recess 64 such that the curved surface 37 of the strip 28 forms a substantially continuous curve from the upper surface of the horizontal section 12 into the front surface of the upright section 14.

Finally the preformed sheet of laminated plastic 30 is glued to the upper and forward-facing surfaces of the base structure and the glue is then cured. Preferably the glue is of a dielectric type which can be cured by dielectric heating which reduces the possibility of deformation of the counter top caused by applying heat to the counter top to cure the glue.

If required, the front roll 18 (FIG. 1) can be modified by omitting the strip 20 and forming a curve in the upper surface and front face of the horizontal section 12. The resulting curve will be similar to the curve 25 in the upright section 14.

What I claim as my invention is:

1. A counter top comprising:
   (a) a first section having front and rear generally upright faces and a generally horizontal upper surface, said upper surface terminating at its rear in a recessed step having a horizontal face extending forwardly from said rear face and a vertical face which extends downwardly from said horizontal surface to meet said horizontal face;
   (b) a second section having a lower face attached to said horizontal face of said recessed step, and a forwardly-facing vertical surface; and
   (c) a filler strip, said filler strip being attached to said horizontal and vertical faces of said recessed step and to the vertical surface of said second section to form a solid rigid joint, said filler strip having an upper concave surface, said concave surface merging smoothly with the vertical surface of said second section and with the horizontal surface of said first section to provide a smooth continuous curve for supporting a sheet of plastic laminate or the like.

2. A counter top as claimed in claim 1 which further comprises a curved front roll merging smoothly into said front face and said upper surface of said first section, said front roll comprising a front filler strip attached to said upper surface adjacent said front face, said filler strip and said first section being curved to present a smooth substantially continuous curve merging smoothly into said upper surface and into said front face.

3. A counter top as claimed in claim 2 which further includes a curved rear roll comprising a convex curved portion of said second section, said convex curved portion merging smoothly into said front surface and said upper face of said second section.

4. A counter top as claimed in claim 3 which further comprises front and rear longitudinal trim strips, said front trim strip being attached to the lower surface of said first section such that a front face of said front trim strip forms a generally vertical extension of said front face of said first section, and said rear trim strip being attached to the rear surface of said second section and having an upper face merging smoothly into said upper face of said second section to form a generally horizontal extension of said upper face of said second section.

5. A counter top as claimed in claim 4 which further comprises a sheet of laminated plastic and the like, said sheet being attached to the upper and forward-facing exposed surfaces of said sections and strips to present a smooth continuous working surface.

References Cited

UNITED STATES PATENTS

| | | | |
|---|---|---|---|
| 2,651,086 | 9/1953 | Corson | 52—622X |
| 2,895,778 | 7/1959 | Lieber | 108—27 |
| 2,890,919 | 6/1959 | Hansen | 108—27 |
| 2,956,288 | 10/1960 | Nolan | 312—140.3UX |

JAMES C. MITCHELL, Primary Examiner

U.S. Cl. X.R.

108—27; 52—622